March 3, 1964     J. P. DE ROSE     3,123,333
ADJUSTABLE SEAT SUPPORT

Filed April 10, 1961     3 Sheets-Sheet 1

INVENTOR
JOHN P. DEROSE

BY *Henry N. Young*
ATTORNEY

INVENTOR
JOHN P. DEROSE

BY Henry N. Young
ATTORNEY

March 3, 1964     J. P. DE ROSE     3,123,333
ADJUSTABLE SEAT SUPPORT
Filed April 10, 1961     3 Sheets-Sheet 3
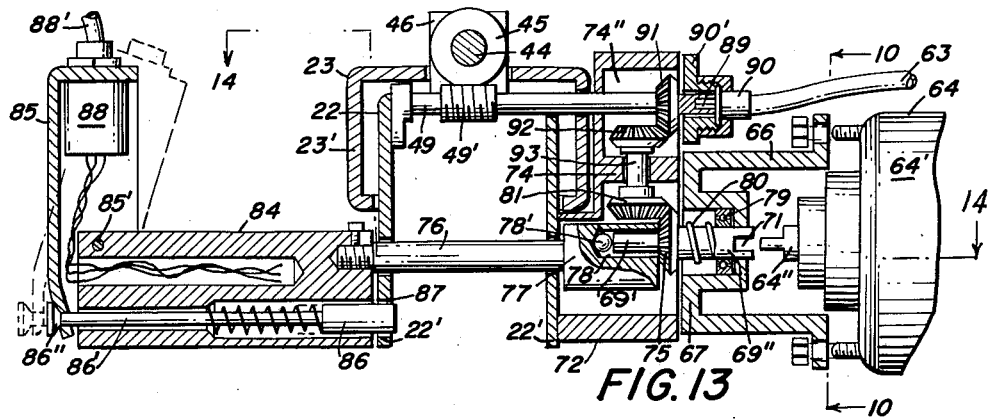
FIG. 13
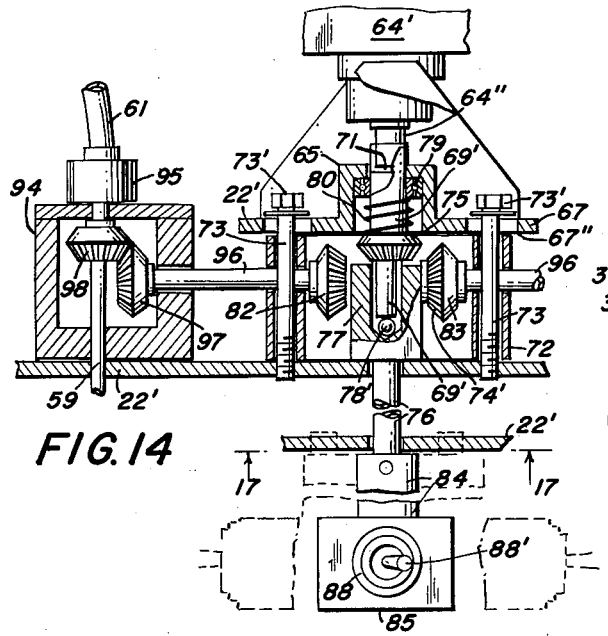
FIG. 14
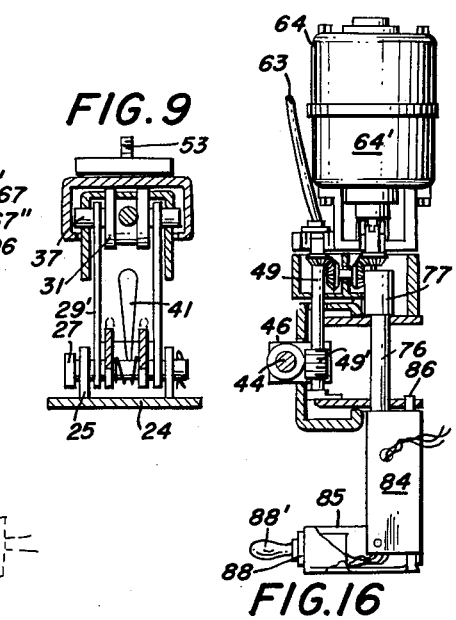
FIG. 9
FIG. 16
FIG. 12
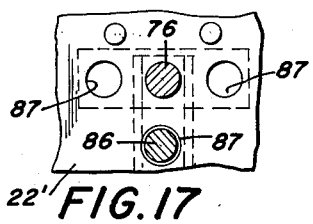
FIG. 17
INVENTOR
JOHN P. DEROSE
BY    *Henry N. Young*
ATTORNEY United States Patent Office 3,123,333
Patented Mar. 3, 1964

3,123,333
ADJUSTABLE SEAT SUPPORT
John P. De Rose, 1708 Janero Drive, Santa Rosa, Calif.
Filed Apr. 10, 1961, Ser. No. 101,992
8 Claims. (Cl. 248—394)

The invention relates to an adjustable support for a seat.

The present seat support assembly comprises a generally improved structure for supporting a seat from a floor-engaging base thereof and providing for mutually independent height and/or angularity and/or fore-and-aft adjustments of the seat to most comfortably fit and position different occupants of the seat, and a principal object is to provide such a seat support having its said adjustments under the selective control of a single hand-set lever and a common power-operated means.

Another object is to assure equalized height adjustments for a supported seat at opposite sides of the seat.

A further object is to provide a seat support of the present character utilizing particularly simple devices for effecting and inherently maintaining its adjustments.

An added object is to provide an adjustable seat support of the character described which will not rattle while in use.

A more specific object is to provide an adjustable seat support having its various adjustments effective in a particularly simple manner by the use of a common actuating means which is particularly adapted for its selective activation by a person occupying the seat.

The invention possessees other objects and features of advantage, some of which, with the foregoing, will be set forth or will be apparent in the following description of a typical embodiment thereof, and in the accompanying drawings, in which FIGURE 1 is a fragmentary and partly sectional plan view of a seat-mounting structure embodying the present invention and taken below a supported seat.

Figure 3:
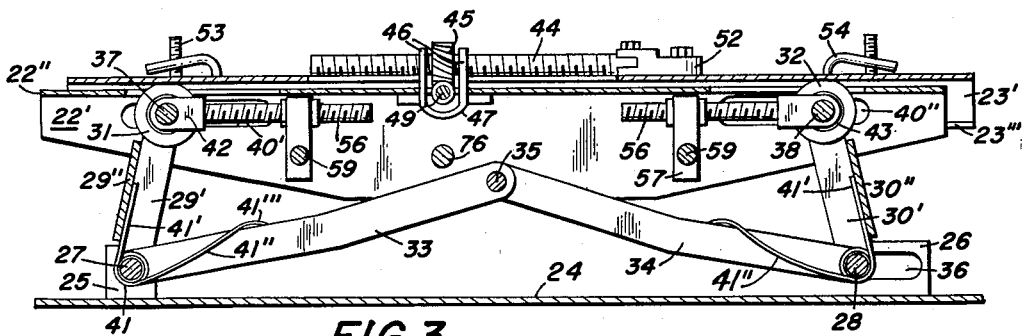
FIGURE 3 is a sectional elevation taken from the line 3—3 in FIGURE 1.
Figure 5:
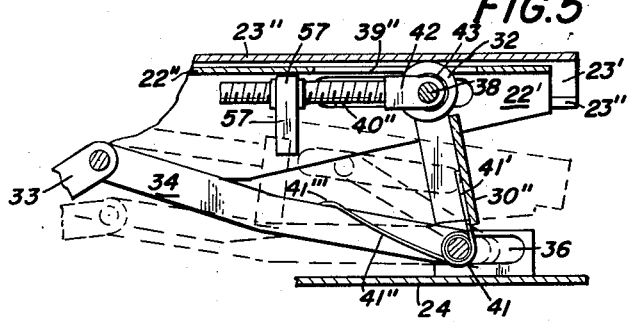

FIGURE 5 disclose a rear portion of the showing of FIGURE 3 and indicates different cooperative relations of upper and lower elements of the present seat support.

Figure 6:
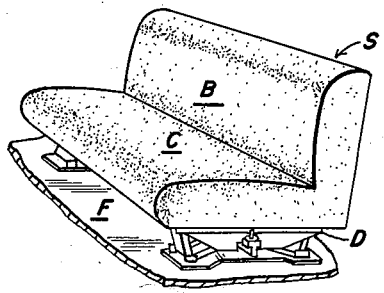

FIGURE 6 is a left-side and reduced showing of the present seat-mounting structure as supporting a seat in adjustably set position.

Figure 7:
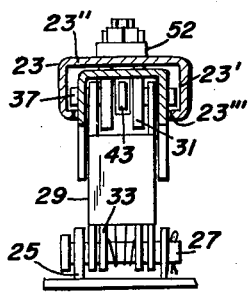

FIGURE 7 is a partial front elevation of the support structure.

Figure 1:
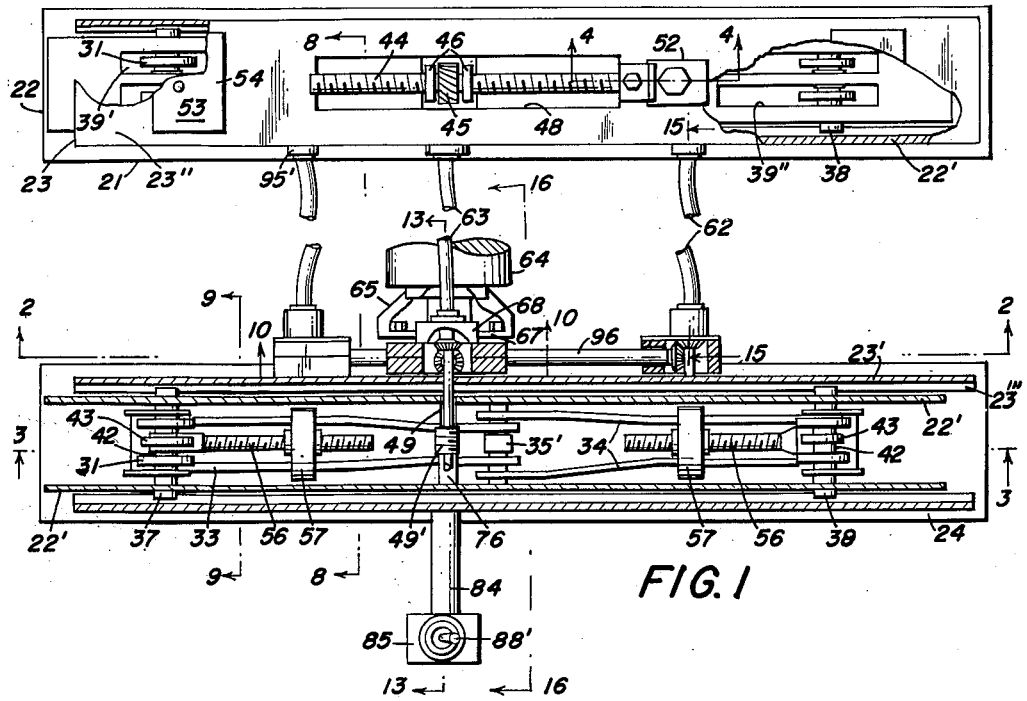
Figure 2:
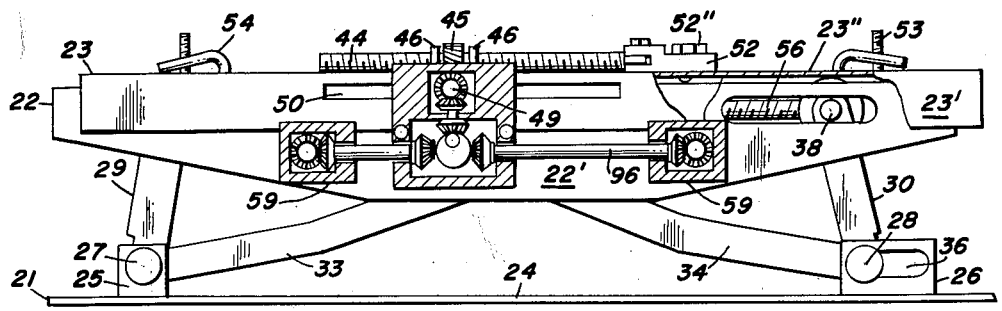
FIGURE 2 is a partly sectional and broken-away view taken from an upright plane through the line 2—2 in FIGURE 1.
Figure 8:
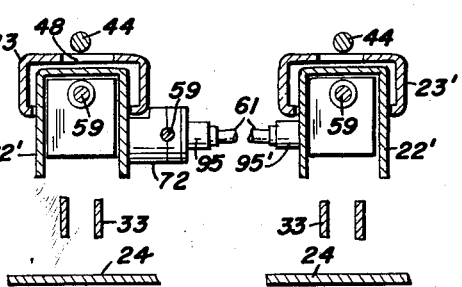

FIGURE 8 is a fragmentary sectional view taken from the line 8—8 in FIGURE 1.

FIGURE 9 is a sectional view taken from the line 9—9 in FIGURE 1.

Figure 11:
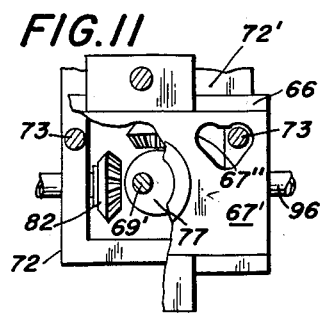
Figure 10:
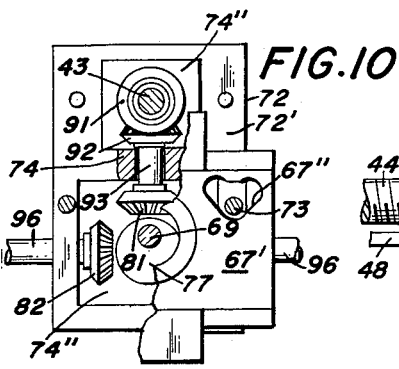
Figure 4:
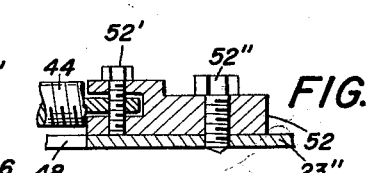
FIGURE 4 is an enlarged fragmentary section taken at the line 4—4 in FIGURE 1.

FIGURES 10 and 11 and 12 are enlarged and partly broken-away views taken from the line 10—10 in FIGURE 13, certain structural members being differently related.

FIGURE 13 is an enlarged sectional elevation taken from the line 13—13 in FIGURE 1.

FIGURE 14 is a fragmentary stepped and partly sectional view taken from the broken line 14—14 in FIGURE 13.

Figure 15:
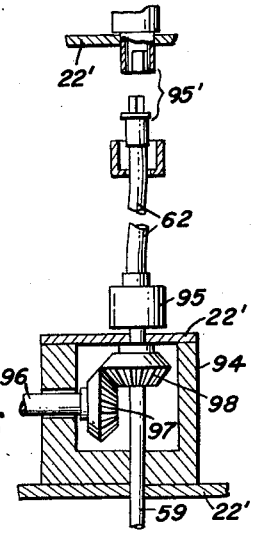

FIGURE 15 is a fragmentary sectional and partly expanded elevation taken from the line 15—15 in FIGURE 1.

FIGURE 16 is a reduced and partly sectional view taken from the line 16—16 in FIGURE 1.

FIGURE 17 is a fragmentary elevation taken from the line 17—17 in FIGURE 14.

An application of the present seat support is generally shown in FIGURE 6 as applied to a unitary seat S having an upholstered back portion B extending from an upholstered seat bottom portion C mounted on a present adjustable support structure which is arranged for its disposal upon a supporting surface such as that provided by a floor F. The present seat bottom C has a rigid bottom plate or frame D arranged for its direct mounting upon the present adjustable support structure which has been particularly designed for the mounting of a seat in a motor-driven vehicle for use by the operator or other riders in the vehicle, though applicable to other seats with which its types of adjustments are advantageous. Essentially, the present seat-supporting assembly generally comprises a pair of complementary base elements 21 for supported disposal on a floor in laterally spaced and parallel relation to extend upwardly from the floor beneath the different seat sides in fore-and-aft relation thereto, mutually complementary intermediate support elements 22 carried on the base members 21 for like height adjustments of the forward or rear seat edge portions, and upper support elements 23 for fixing to a seat bottom D adjacent its ends to depend therefrom and to be carried by the elements 21 for corresponding like fore-and-aft adjustments with respect to the intermediate elements 22.

The present base elements 21 each include a rectangular base plate portion 24 provided with upstanding pairs of mutually spaced ears 25 and 26 adjacent their forward and rear ends respectively, and the ears of said pairs are provided with transverse and aligned openings for mounting in and between the pins 27 and 28 hingedly mounting on the ears the lower ends of strut members 29 and 30 arranged for their relative swinging about axes parallel to a supporting floor F while rollers 31 and 32 mounted on the upper strut ends are in direct and constant supporting engagement with the corresponding upper element 23. As particularly shown in FIGURES 1 and 7 to 9 and 13, the intermediate elements 22 is of inverted rectangular channel section, having its side flanges 22' mutually parallel and spaced as the ears 25 and 26, with said flanges integrally connected by the flat web 22" of the element and being deeper at corresponding intermediate portions thereof between end portions which taper to the element ends. The upper element 23 is of uniform rectangular channel section peripherally thereof and receives the upper portion of the element 22 between its depending flanges 23' while its web portion 23" overlies the web 22" of the element 22 and is engaged by support rollers 31 and 32 carried at the upper ends of the strut members 29 and 30 respectively in an arrangement which provides for fore-and-aft adjustments of the roller-supported element 23 along the member 22.

A means is provided for securing and intermediate point of the element 22 is fixed relation to the pins 27 and 28 about which the strut members 29 and 30 are respectively adjustable to adjust the angularity of the intermediate element 22 with respect to the base element in effecting height and/or slope adjustments of the seat bottom C. Accordingly, links 33 and 34 pivotally connect the pins 27 and 28 with a common connecting pin 35 which is mounted in and between the flanges 22' of the element 22 at an intermediate flange point adjacent and slightly above its bottom edge, whereby swinging adjustments of the struts 29 and 30 may be independently effected. A means is also provided for permitting any required change in the mutual spacing of the pins 27 and 28 during angular or height adjustments of the intermediate element 22, and such present means comprises the engagement of the ear-carried pivot pin 27 in complementary holes provided in the forward ear pair 25 while the other ear-engaging pivot pin 28 extends through and between transversely aligned slots 36 extending in the other pair of ears 26 in parallel relation to the base plate 24 and having its width substantially that of the received pin to permit solely a sliding movement of the pin along the slot.

By particular reference to FIGURES 3 and 5 and 7, it will be noted that the present strut members 29 and 30 are of like rectangular channel section intermediately thereof, and have mutually parallel flange portions 29' and 30' extending longitudinally beyond web portions 29" and 30" thereof respectively and transversely spaced to swingably fit between and adjacent the ears of the ear pairs, with the extending upper and lower flange portions of said struts providing openings which respectively receive the bottom strut-hinging pins 27 and 28 therein and journal shaft pins 37 and 38 which respectively mount the top strut-carried support rollers 31 and 32. As particularly shown, the links 33 and 34 are flat and extend in pairs from terminal lower eyes receiving the hinge pins 27 and 28 adjacent the ears at their ear-secured ends, while the link end portions which provide the eyes of each pair receiving the pin 35 are mutually lapped adjacent the flanges 22' of the element 22 and may be held apart by a pin-carried spacing sleeve.

As particularly disclosed in FIGURES 5 and 9, the support rollers 31 and 32 on the respective strut-carried shafts 37 and 38 are disposed adjacent and between the corresponding pairs of strut flanges 29' and 30' respectively and extend freely and radially through forward and rear longitudinal slots 39' and 39" in the web portions 22" of the element 22 in direct simultaneous supporting engagement with the web 23" of the upper flange 23. End portions of the shafts 37 and 38 respectively extend beyond the portions of the strut flanges 29' and 30' which carry them and into longitudinal slots 40' and 40" provided in the opposed flanges 22' of the element 22, and are so related to the element 22 longitudinally thereof that their mutually opposite ends comprise stops to limit the raising of the struts 29 and 30 beyond limiting upright positions thereof or the mutually inward lowering of the struts beyond practical limits. Preferably, and as shown, the side flanges 23' of each upper support element 23 are provided with mutually inturned and uniform extensions 23'" which freely and closely receive the side flanges 22' of a mounted element 22 between them, whereby to provide between the opposed element flanges 23' and 22' spaces in which terminal portions of the strut-journalled shafts 37 and 38 beyond the flanges 22' are cooperative with the flange extensions 23'" to prevent a lifting of the element 23 from its supported mounting on the rollers 31 and 32.

A means is provided for yieldingly urging a limiting raised positioning of the mounted seat, and as shown in FIGURES 3 and 5 and 9, springs 41 are preferably cooperative between the link pairs 33 and 34 and the corresponding struts 29 and 30 to which they are hingedly related. Essentially, a present spring 41 comprises a length of spring wire of appropriate gauge and resiliency doubled upon itself to provide a generally planar bight portion 41' integrally connected to mutually coplanar and normally straight end portions 41" by reversedly related helical-coil portions whereby the bight portion 41' and the combination of the straight end portions 41" of the spring have a normal acute-angled opposed relation. As shown, a spring 41 is arranged for its operative installation in the present seat support assembly by having the hinge pins 27 or 28 engaged through the eye provided by the intermediate helical portions of the spring while its bight portion 41' is seated against the opposed side of the corresponding strut web 29" or 30", and the spring arm portions are deflected toward the seated portion to engage laterally directed terminal portions 41'" of the arms 41" against the upper edges of the corresponding links 33 and 34, whereby the spring may thereby constantly urge a corresponding strut 29 or 30 toward its limiting upright seat-raising position to engage its roller-carrying shafts 37 and 38 with the mutually outer ends of the slots 40' and 40" while the helical spring portions jointly function as a spacer means between the link ends thereat, whereby a lowering of the seat must always be effected against the cooperative resistance of the cooperative springs 41. Clevis blocks 42 for use in adjustably disposing the struts 29 and 30 beneath the supported elements 22 and 23 are disposed between the strut-carried rollers 31 and 32 in spacing relation thereto and have the aligned eyes of their sides journalling the shafts 37 and 38, while the shaft portions between the block sides mount rollers 43 which are smaller than the rollers 31 and 32 and are engageable with the web 22" of the element 22 for supporting the element 22 from said shafts with its web portion 22" in spaced parallel relation from the web portion 23" of the element 23.

By particular reference to FIGURES 1 to 4 inclusive, it will now be noted that a jack means is provided for positioning and holding the upper support element 23 in longitudinally adjusted relation to the underlying intermediate support element 22, and includes a jack-screw 44 which has one end attached to the web 23" of the element 23 in longitudinal relation thereto and rotatively mounts a nut 45 which is held against axial shifting with respect to the web 22" of the element 22 by its retention between fixedly spaced positioning ears 46 receiving the screw therethrough and extending upwardly through the web 22" from a base block 47 mounted on and beneath said web and through a rectangular opening 48 provided in the web 23" opposite the screw 44, whereby a rotation of the nut 45 about the mounting screw 44 is operative to longitudinally shift the attached element 23 with respect to the element 22 between limits imposed by the engagement of the ears 46 with the different ends of the opening 48. As shown, the nut 45 peripherally comprises a worm gear arranged for its rotation about the threadedly-received screw 44 by the tangential engagement therewith of a worm screw portion 49' of a shaft 49 which is journalled in the ear-providing block 47 and has an end portion thereof extending freely through and from a slot 50 provided in the innermost flange 22' of the element 22 for its engagement by a suitable rotating means therefor.

As particularly shown, one end of the screw 44 is fixed to the web 23" adjacent an end of its opening 48, as by means of its pivoted connection to an anchor block 52 at an upright screw pin 52' engaging said block which is secured to said web by a tap screw 52", this strut-anchoring connection and the engagement of the worm-gear nut 45 on the screw 44 between the ears 46 being cooperative to maintain a mounting of the screw in non-binding relation in the nut. Also, noting that the screw 44 and the nut-positioning ears 46 of the block 52 and the screws of the screw-attaching block 52 extend somewhat above the upper face of the web 23" of the element 23, and that said web is arranged to be secured to the bottom seat plate D, screws 53 for fixedly mounting a seat on the element 23 extend upwardly from the web 23" adjacent the ends thereof and through suitable spacing members 54 interposed between the web and the bottom seat plate D to provide the necessary clearance for the screw 44 and other members of the support assembly extending above the web 23".

The present clevis blocks 42 on the strut-carried shafts 37 and 38 are alike and are provided with positioning jack screws 56 extending integrally therefrom and in perpendicular relation to the axes of the coaxial shaft-journaling bores provided through their arms, with each said screw extending through a housing 57 in which a nut (not shown) mounted on it is suitably swiveled against axial movement therein, each said housing being suitably fixed to and between the flanges 22' of the element 22 to direct the axes of the screws 56 toward each other in coaxial relation and in fixed parallel relation to the web 22" of the element 22. As with each jack screw 44 which controls the relative positioning of associated elements 22 and 23, the exterior of a screw-carried nut in a housing 57 comprises a spiral gear which is tangentially engaged by a worm (not shown) provided by a shaft 59 journaled in the housing 57 and extending through and from a mounting web 22" for its suitable engagement and rotation for a cooperative functioning of the associated nut and screw as a screw-jack means to adjustably swing the corresponding strut 29 or 30 about its hinge pin 27 or 28 for variably spacing the end of the seat-carrying element 23 thereat with respect to the base plate 24 of the support assembly to thereby adjust the height and/ or angular position of the seat in a readily understood manner.

Since height and angularity and fore-and-aft adjustments of the sides of seats carried by the present complementary adjustable support assembly portions are necessarily equal, the corresponding extending ends of the pairs of forward and rear control shafts 59 and of the control shafts 49 are connected by flexible shafts 61 and 62 and 63 respectively for their selected operative actuations in pairs, as is indicated in FIGURES 1 and 8 and 13. Also, since an appreciable effort is required for actuating a pair of connected control shafts 49 or 59 in readily making desired adjustments of a seat for a most advantageous use thereof by a particular person, and particularly while the person is positioned on the seat, a common power-operated means is preferably provided for actuating the different positioning control shafts and conveniently comprises a reversibly operative electric motor 64 which, as for a vehicle operator's seat, is shown as mounted on the left-side support element 22 at its inner side intermediately thereof and is selectively connectable with the different control shafts 49 and 59 by a suitable means for effecting desired adjustments of a seat S with respect to the fixedly disposed base elements 21.

As particularly brought out in FIGURE 1 and in FIGURES 13 to 16 inclusive, the reversible drive motor 64 is shown as arranged for its full support from an element 22 by a generally U-shaped bracket 65 having opposite side arm portions 66 arranged for their fixing to an end of the motor casing 64' and extending from an end portion 67 having a flat outer face 67' about an integral cup-shaped bracket portion 68 which is offset inwardly from the outer bracket face 67' toward the motor in the axial line of the motor shaft 64" to define a cylindrical space forwardly of its inner end. The inner end of the bracket portion 68 has a power-transmitting, or drive, shaft 69 extending therethrough in the line of the motor shaft 64" and from a mutual clutch connection 71 thereof with the opposed motor shaft end when the bracket sides 66 are bolted to the motor casing for supporting the motor from an element 22, the present connection 71 being of a tongue-and-slot type. It will be understood, however, that the motor 64 might be fixedly disposed on the seat-supporting floor, and then have its shaft 64" connected to the drive shaft 69 by a flexible connecting shaft to avoid a carrying of the motor by a present adjustable seat-support assembly.

For a reason to be hereinafter brought out, the bracket 68 is shiftably mounted on and opposite a supporting member 72 which provides a gear box and is suitably fixed to the inner side of the flange 22' of the left-side element 22 at an intermediate point longitudinally thereof. As shown, the gear-box member 72 provides a planar face 72', and the heads 73' of tap screws 73 adjustably engaged in the member 72 below the depending inner flange 23' of the upper element 23 appropriately secure the opposed end 67 of the bracket 65 on the block for a required limited guide lateral movement of the bracket and motor upon the member 72 opposite the opposed face 72' thereof. As is brought out in FIGURE 13, the cavity of the gear box 72 is divided by a partition 74 to define lower and upper spaces 74' and 74", and said spaces are open at the face 72', with the space 74' disposed opposite the space of the bracket portion 68 and arranged to have the installed shaft member 69 extending from the bracket end 67 into said space and intermediately and fixedly carrying a bevel gear 75 between shaft portions 69' and 69", with the shaft portion 69' and the gear 75 disposed in the space 74'.

By particular reference to FIGURES 10 to 13 inclusive, it will be noted that a spindle 76 is journaled in and between the flanges 22' of the element 22 on which the motor 64 is mounted, and that said spindle fixedly carries within the lower gear-box space 74', a member 77 which provides a cylindrical socket 78 for constantly and rotatively receiving the shaft portion 69" in eccentric paralle relation to the axis of the spindle 76; as shown, the member 77 is of cylindrical outline and the axis of its cylinder has the same eccentric relation to the spindle 76 as the socket 78. A suitable ring bearing 79 disposed in the space of the bracket portion 68 journals the installed shaft 69 thereat, and is arranged for its normal seated engagement against the inner end of the portion by the action of a helical compression spring 80 freely enclosing the shaft portion between said end and the bevel gear 75 to yieldingly maintain the extremity of the shaft portion 69" in the socket 78 against a positioning ball-bearing 78' provided at the inner socket end, while the connection 71 between the shaft 69 and the motor shaft 64" is maintained.

It will now be particularly noted that appropriate rotative adjustments of the member 77 are arranged to alternatively dispose the drive gear 75 on the mounting drive shaft 69 in actuating engagement with bevel gears 81 and 82 and 83 of which the gear 81 is connected with the shaft 49 for controlling fore-and-aft adjustments of each support element 23 with respect to the element 22 (FIGURES 10 and 13 and 14) and of which the gears 82 and 83 are connected with the different shafts 59 for controlling the front and rear height adjustments of each intermediate element 22 with respect to the corresponding element 21 (FIGURES 11 and 12 respectively). As is brought out in FIGURES 13 and 14 and 17, the selective positioning of the member 77 is arranged to be effected by manual rotative manipulations of a member 84 which comprises an extension of the spindle 76 and is fixedly mounted on the end of the spindle 76 which extends transversely outwardly from the outer flange 22' of the spindle-carrying element 22 at the left-side support assembly, and is provided with a crank-arm handle member 85 at its outer end. Since rotative adjustments of the member 77 by the member 84 are arranged to produce lateral adjustments of the drive shaft 69 and the bracket 65 with respect to the member 72 carried by the element 22, the bracket end portion 67 is provided with appropriately shaped openings 67" to provide for the free extension therethrough of the shanks of the bracket-mounting screws 73, this feature being brought out in FIGURES 10 to 12 inclusive.

A means is preferably provided for securing the member 84 in different rotatively adjusted positions in which the drive gear 75 engages the different shaft actuating gears 81 and 82 and 83, such positions being shown in FIGURE 17 as ninety degrees apart, and the disclosed said means comprises a reciprocable spring-loaded detent bolt 86 which is reciprocably mounted in the member 84, is operative in a line offset from and parallel to the axis of the spindle 76, and is normally and selectively engaged in a locking hole 87 of a set provided in an arcuate line thereof in the flange 22' of the element 22 from which the member 84 extends, and concentric with the spindle axis. As shown, the release of the bolt 86 from a hole 87 for re-positioning the member 84 is arranged to be effected by manually rocking the arm 85 toward the adjacent element 23 about a hinge pin 85' by which it is attached to the member 84 for swinging about an axis perpendicular to and substantially in line with the axis of the spindle 76 to withdraw the bolt through the coaction of the arm 85 with the head 86' of a stem 86 extending axially from the bolt.

At its outer end, the arm 85 mounts a suitable switch assembly 88 which is appropriately connected in the reversible motor-energizing circuit of the motor 64 by three conductors and includes a circuit-closing arm 88' which is manually deflectable against spring resistance between limiting closed-circuit positions from a normal intermediate open-circuit position, whereby a motor-energizing circuit is held closed only by and during a deliberate holding of the switch arm 88' in a selected circuit-closing position. Since relative movements of the elements 21 and 22 and 23 are mechanically limited in the indicated manners, the teeth on the primary bevel drive gear 75 are arranged to be deflected by and over the teeth of the driven bevel gears 81 and 82 and 83 in the event of the creation of an overload condition beyond a gear 81 or 82 or 83 engaging the gear 75, for an over-riding clutch action against the yielding resistance of the spring 80 which is normally operative to maintain the engagement of the gear 75 with an engaged said gear 81 or 82 or 83, whereby to protect the present support structure against possible inadvertent damage, the teeth of said gears being suitably hardened for maintaining the operativeness of the present gear connections.

By particular reference to the showings of FIGURES 10 and 13, it will now be noted that the shaft 49, on which the nut 45 on the jack-screw 44 is actuatable by the action of the worm 49' for effecting fore-and-aft adjustments of the element 23 with respect to the element 22 extends through the innermost flanges 22' and 23' of the elements 22 and 23 and the upper space 74'' of the gear box 72 to a suitable coupling 89 for the flexible shaft 63 provided at a member 90 fixedly mounted on the gear box at its face 72' and having a lower part of its base portion 90' arranged for its general guiding cooperation with the movable plate 67 between the positions assumable by it as the plate is shifted in accordance with rotative adjustments of the member 77 to laterally shift the eccentrically received shaft end portion 69'. The shaft 49 mounts a bevel gear 91 in the space 74'' adjacent the base 90', and the gear 91 engages a bevel gear 92 mounted at the upper end of a shaft 93 extending through the partition 74 in swiveled relation thereto and carrying the gear 81 at its lower end in appropriately fixed position within the space 74'' for engagement by the selectively usable common drive gear 75 on the shaft 69.

FIGURES 2 and 8 and 14 and 15 disclose that the forward and rear shafts 59 which control the adjustments and set positionings of the struts 29 and 30 respectively extend into and through gear box members 94 directly mounted on the innermost flange 22' of the left-side seat-support assembly at opposite sides of the gear box 72 which is mounted on said flange. The shafts 59 extend into members 95 providing couplings, such as the couplings, 89 for the shafts 49, for providing connections with the flexible shafts 61 and 62 by which the connected jack screws 56 of the right-side support assembly are operable through connections provided at members 95' corresponding to the members 95. Shafts 96 mounting the gears 82 and 83 in the space 74' of the gear housing 72 extend laterally oppositely from said space in perpendicular and coplanar relation to the drive shaft 69 and into the gear boxes 94 where they mount bevel gears 97 which constantly engage bevel gears 98 mounted on the control shafts 59, whereby the actuation of a gear 82 or 83 by the drive gear 75 is arranged to simultaneously rotate the corresponding driven shafts 59 and the extensions thereof provided by the flexible shafts 61 or 62 for providing like adjustments of the struts 29 and/or 30 beneath both seat sides.

It will now be generally noted that the upright positioning of the arm 85 is preferably that required for engaging the drive gear 75 with the gear 81 by which the shaft 49 is actuatable for effecting forward or rearward adjustments of the seat element 23 with respect to the seat element 22, and that subsequent forward and rearward switch-closing displacements of the switch arm 88' in an upright plane perpendicular to the axis of rotation of the gear 75 will effect corresponding seat adjustments. On the other hand, a forwardly directed positioning of the arm 85 is preferably that required for engaging the drive gear 75 with the gear 82 by which the forward control shaft 59 is preferably actuatable for raising or lowering the forward seat edge portion carried by the elements 22 and 23 when the switch arm 88' is swung upwardly or downwardly respectively, while a rearwardly directed positioning of the arm 85 is utilized for raising or lowering the rearward seat portion under control of the switch 88 in a corresponding manner, it being understood that both height and slope adjustments of a seat portion C are effectable by a coordinated use of these seat-height adjustments.

In view of the foregoing, it will be understood that all desirable positioning adjustments of a seat carried by a present seat support assembly are under the sole control of the appropriately set arm 84 and the switch 88 by successively utilizing the arm to engage the primary (or master) gear 75 with the appropriate gear 81 or 82 or 83, and then appropriately displacing the switch-closing arm 88' until the desired adjustment has been effected, with reverse adjustments possible. While such is not shown, it will be obvious that the different branches of the motor-energizing circuit may include suitable normally closed limit switches for their opening as limiting relative positions of the elements 21 or 22, or of the elements 22 and 23, are reached whereby to further protect the mechanism against its possible overloading in case a switch of the switch assembly 88 is held closed too long by the switch-closing arm 88'.

From the foregoing description taken in connection with the accompanying drawings, the advantages of the present adjustable seat support will be readily understood by those skilled in the art to which the invention appertains. While I have shown and described an arrangement which I now consider to be a preferred embodiment of my invention, I desire to have it understood that the showings are primarily illustrative, and that such changes and developments may be made, when desired, as fall within the scope of the following claims.

I claim:

1. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, strut members extending upwardly from hinged connections at mutually spaced forward and rear points of the base element provided with shaft members at their upper ends, rollers on said strut-carried shaft members in supporting contact with the upper element, rollers on said shafts supporting the intermediate element therefrom for relative fore-and-aft adjustments of the upper and intermediate elements, means cooperative between said struts and the intermediate element for independently effecting and maintaining adjustments of said struts with respect to the upper element, and a means cooperative between said upper and intermediate elements for effecting and maintaining a relative fore-and-aft adjustment of the upper element with respect to the intermediate element.

2. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, strut members hingedly related to said base element at mutually spaced forward and rear points thereof and extending upwardly from the base element to movably engage mutually spaced and independent points of supporting contact with the upper element, means directly supporting the intermediate element on said struts, means operative from the intermediate element to angularly and selectively adjust said strut members between limiting sloping positions and limiting upright positions for adjusting the mutual spacing of the base and upper elements at and between the corresponding said hinging points and contact points of different struts, means operative from the intermediate element to longitudinally adjust said upper element with respect to said intermediate element, a reversible drive shaft mounted on the intermediate member, and a means on the intermediate member for actuation by the occupant of the supported seat for selectively connecting a said adjusting means with said shaft for its actuation by the shaft.

3. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, swingable strut members independently and supportingly coactive between the base and upper elements at forward and rear points of contact therewith and angularly adjustable between different angular positions thereof with respect to the horizontal to independently adjust the mutual spacing and/or angularity of the base and upper elements between said contact points, means supporting the intermediate element directly on said struts for relative fore-and-aft adjustments of the upper and intermediate elements, links of fixed length connecting said intermediate element to said base element for preventing an appreciable relative longitudinal movement of the linked said elements, and a common means operative from one said element to selectively and individually adjust the angularity of the different said strut members or the fore-and-aft relation of the upper and intermediate elements.

4. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, swingable strut members independently and supportingly coactive between the base and upper elements at forward and rear points of contact therewith and angularly adjustable between different angular positions thereof with respect to the horizontal to independently adjust the mutual spacing and/or angularity of the base and upper elements between said contact points, means supporting the intermediate element directly on said struts for relative fore-and-aft adjustments of the upper and intermediate elements, links of fixed length connecting an intermediate point of said intermediate element with the base element at the forward and rear points of connection of the struts therewith, a spring means cooperative between said links and the corresponding struts constantly biasing the struts to limiting upright positions thereof in which the strut-engaged points of the upper element are uppermost, and a common means operative from one said element to selectively and individually adjust the angularity of the different said strut members or the fore-and-aft relation of the upper and intermediate elements.

5. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, swingable strut members independently and supportingly coactive between the base and upper elements at forward and rearward points of contact therewith and angularly adjustable between different angular positions thereof with respect to the horizontal to independently adjust the mutual spacing and/or angularity of the base and upper elements between said contact points, means supporting the intermediate element directly on said struts for relative fore-and-aft adjustments of the upper and intermediate elements, and a common adjusting means operative from one said element and comprising a drive shaft having screw-jack connections with the different strut members and a screw-jack connection with the upper element to selectively and individually adjust the angularity of the different said strut members or the fore-and-aft relation of the upper and intermediate elements.

6. In an adjustable seat support assembly including a base element disposed beneath the seat in fore-and-aft relation thereto and an upper element depending from the seat in fixed fore-and-aft relation thereto and an intermediate element extending longitudinally of and between the base and upper elements, swingable strut members independently and supportingly coactive between the base and upper elements at forward and rear points of contact therewith and angularly adjustable between different angular positions thereof with respect to the horizontal to independently adjust the mutual spacing and/or angularity of the base and upper elements between said contact points, means supporting the intermediate element directly on said struts for relative fore-and-aft adjustments of the upper and intermediate elements, a common drive shaft carried by the intermediate element and arranged for its connection to a reversible drive means and having individual screw-jack connections with the different strut members and a screw-jack connection with the upper element, and a common means is provided for selectively connecting the different screw-jacks with the drive shaft.

7. In an adjustable seat support assembly including a lower base element disposed in fore-and-aft relation to the seat and an upper seat-mounting element overlying the base element in spaced relation thereto and depending from the seat in fixed fore-and-aft relation thereto, means unitarily interconnecting the elements for independent adjustments of the relative spacing of the forward end portions of the lower and upper elements or the relative spacing of the rearward end portions of the lower and upper elements or the fore-and-aft relation of said lower and upper elements, a common means for adjusting the relation of the elements as aforesaid and comprising a drive shaft rotatably carried by the assembly, means cooperative between the shaft and the different said elements for selectively and operatively connecting said shaft with either said element, and a rockably adjustable spindle member journaled in the support assembly and extending laterally therefrom in a line parallel to that of the shaft axis and actuatable by a handle member directed radially from the extending spindle portion for establishing a said operative connection between the shaft and the seat-support assembly.

8. The structure of claim 7 in which the shaft is arranged for its actuating connection with the shaft of a reversible electric motor, and the spindle handle carries the control switch for the motor activating circuit.

References Cited in the file of this patent

UNITED STATES PATENTS

| | | |
|---|---|---|
| 2,149,946 | Whedon | Mar. 7, 1939 |
| 2,892,483 | De Rose | June 30, 1959 |
| 2,930,428 | De Rose | Mar. 29, 1960 |